US007827701B2

(12) United States Patent
Wharton et al.

(10) Patent No.: US 7,827,701 B2
(45) Date of Patent: Nov. 9, 2010

(54) TEMPLATE

(75) Inventors: Elisabeth Wharton, Perrysburg, OH (US); William Wharton, Perrysburg, OH (US)

(73) Assignee: E & R Wharton, LLC, Perrysburg, OH (US)

( * ) Notice: Subject to any disclaimer, the term of this patent is extended or adjusted under 35 U.S.C. 154(b) by 48 days.

(21) Appl. No.: 12/366,676

(22) Filed: Feb. 6, 2009

(65) Prior Publication Data

US 2009/0205217 A1 Aug. 20, 2009

Related U.S. Application Data

(60) Provisional application No. 61/029,082, filed on Feb. 15, 2008.

(51) Int. Cl.
*G01B 3/00* (2006.01)
*B43L 13/20* (2006.01)
*A41H 3/00* (2006.01)

(52) U.S. Cl. .......................................................... 33/562

(58) Field of Classification Search .................. 33/565, 33/562, 563, 564, 566

See application file for complete search history.

(56) References Cited

U.S. PATENT DOCUMENTS

| | | | | | |
|---|---|---|---|---|---|
| 699,738 | A | | 5/1902 | Zange | |
| 2,080,620 | A | | 5/1937 | Martin | |
| 2,230,010 | A | * | 1/1941 | Owens | 33/489 |
| 2,246,491 | A | * | 6/1941 | Abell | 33/489 |
| 2,364,529 | A | | 12/1944 | Hill | |
| 2,522,908 | A | * | 9/1950 | Szabo | 33/489 |
| 3,071,171 | A | * | 1/1963 | Guerrero | 33/524 |
| 3,738,010 | A | * | 6/1973 | Carder | 33/489 |
| 3,797,122 | A | * | 3/1974 | Smith | 33/562 |
| 4,057,898 | A | * | 11/1977 | Piosky | 30/289 |
| 4,246,702 | A | * | 1/1981 | Burt | 33/565 |
| 4,274,459 | A | | 6/1981 | Galajda | |
| 4,443,953 | A | | 4/1984 | Gregory | |
| 4,683,836 | A | | 8/1987 | West | |
| 4,926,564 | A | | 5/1990 | Loggins | |
| 4,930,382 | A | * | 6/1990 | Collins | 83/13 |
| 4,945,642 | A | | 8/1990 | Saulietis | |
| 5,172,482 | A | | 12/1992 | Coleman | |

(Continued)

FOREIGN PATENT DOCUMENTS

DE 299 00 716 U1 11/1999

(Continued)

*Primary Examiner*—Christopher W Fulton
(74) *Attorney, Agent, or Firm*—Fraser Clemens Martin & Miller LLC; J. Douglas Miller

(57) ABSTRACT

A template for assisting a person with drawing and cutting two-dimensional shapes is disclosed. In one embodiment the template is a substantially planar member spaced apart surfaces. The template is formed in a selected shape having a handle disposed on one surface and a skid-resistant member disposed on an opposite surface. The handle and the skid-resistant member facilitate holding the template stationary in respect of a writing surface while tracing the shape of the template. In another embodiment the template includes two members formed in substantially matching shapes. A plurality of magnets is employed to secure the two members in substantial alignment having a material disposed therebetween. The outer edges of the two members provide a guide for cutting a piece of the material in a shape conforming to the shape of the template.

8 Claims, 3 Drawing Sheets

U.S. PATENT DOCUMENTS

| | | | | | |
|---|---|---|---|---|---|
| 5,191,716 | A | | 3/1993 | Anderson | |
| 5,201,783 | A | | 4/1993 | Peters | |
| 5,615,488 | A | * | 4/1997 | Brady | 33/484 |
| 5,864,959 | A | | 2/1999 | Johansen et al. | |
| 6,138,884 | A | * | 10/2000 | Gish | 225/1 |
| 6,575,068 | B2 | * | 6/2003 | Lira-Nunez et al. | 83/565 |
| 6,931,750 | B1 | | 8/2005 | Lee | |
| 7,191,530 | B1 | | 3/2007 | Thibodeaux | |

FOREIGN PATENT DOCUMENTS

| | | | |
|---|---|---|---|
| EP | 1 028 004 | A1 | 1/2000 |
| JP | 11007238 | A | 12/1999 |

* cited by examiner

TEMPLATE

CROSS-REFERENCE TO RELATED APPLICATION

This application claims the benefit of U.S. Provisional Patent Application Ser. No. 61/029,082 filed on Feb. 15, 2008, hereby incorporated herein by reference in its entirety.

FIELD OF THE INVENTION

The invention relates to a template, and more specifically to a template for two-dimensional shapes facilitating drawing and cutting out of the geometric shapes.

BACKGROUND OF THE INVENTION

A person can typically draw and cut out geometric shapes such as circles, triangles, squares, and letters and numbers freehanded, or by following a template. However, for young children and physically or mentally challenged individuals, the task of drawing and cutting out geometric shapes and letters and numbers can be a significant challenge.

Young children and physically or mentally challenged individuals typically require assistance as they develop the necessary motor skills to draw and cut out geometric shapes and letters and numbers. The required assistance typically is provided by a teacher or a parent. However, the assistance may limit the development of the motor skills in the individual being assisted, or may reduce the personal sense of accomplishment in the individual being assisted.

Alternatively, a drawing template can be provided to the individual to assist in the drawing and cutting out of geometric shapes and letters and numbers. Examples of prior art templates are U.S. Pat. No. 2,080,620 to Martin, U.S. Pat. No. 2,364,529 to Hill, and U.S. Pat. No. 4,926,564 to Loggins. The drawing template can alleviate the above identified shortcomings associated with another person providing assistance to the individual. However, prior art templates require the individual to have sufficient motor skills to coordinate the gripping of the template and holding the template stationary in respect of a writing surface or material with one hand while using a writing instrument or scissors to trace or cut around the template, respectively. The prior art drawing templates are not adapted to be easily gripped or held stationary by a young child and physically or mentally challenged individuals. Rather than providing the intended assistance, the prior art templates may increase the difficulty of drawing and cutting out of geometric shapes, inhibit the development of motor skills, and discourage individuals from developing motor skills and artistic talents.

It would be desirable to have a template adapted to facilitate gripping the template and maintaining a fixed position of the template while tracing and cutting out the geometric shape of the template.

SUMMARY OF THE INVENTION

Compatible and attuned with the present invention, a template adapted to facilitate gripping the template and maintaining a fixed position of the template while tracing and cutting out the geometric shape of the template, has surprisingly been discovered.

The above objective, as well as others, may be achieved by a template comprising a main body formed in a desired shape and having spaced apart surfaces; a handle formed on the main body; and a securing member for militating against a movement of the template in respect of a material coupled to the main body, wherein the handle and the securing member facilitate gripping the template and maintaining the template in a fixed position in respect of the material.

The above objective may also be achieved by a template comprising a main body formed in a desired shape and having spaced apart surfaces; a handle formed on the main body; and a skid-resistant member coupled to one of the surfaces of the main body, wherein the handle and the skid-resistant member facilitate gripping the template and maintaining the template in a fixed position in respect of a writing surface.

The above objective may also be achieved by a template comprising a first template member formed in a desired shape and having spaced apart surfaces; a second template member formed in the desired shape and having spaced apart surfaces; and a securing member for securing the first template member to the second template member, wherein a material disposed between the first template member and the second template member can be cut by a user.

BRIEF DESCRIPTION OF THE DRAWINGS

The above, as well as other objects and advantages of the invention, will become readily apparent to those skilled in the art from the following detailed description of an embodiment of the invention when considered in the light of the accompanying figures, in which.

DETAILED DESCRIPTION OF AN EMBODIMENT OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
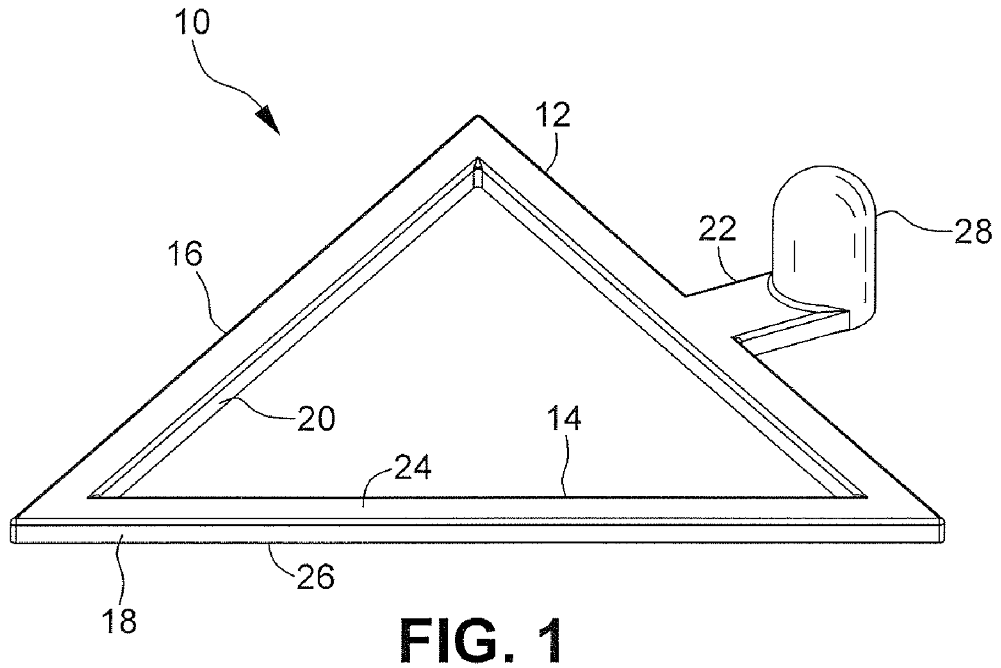
FIG. 1 is a top perspective view of a template according to an embodiment of the invention.
Figure 2:
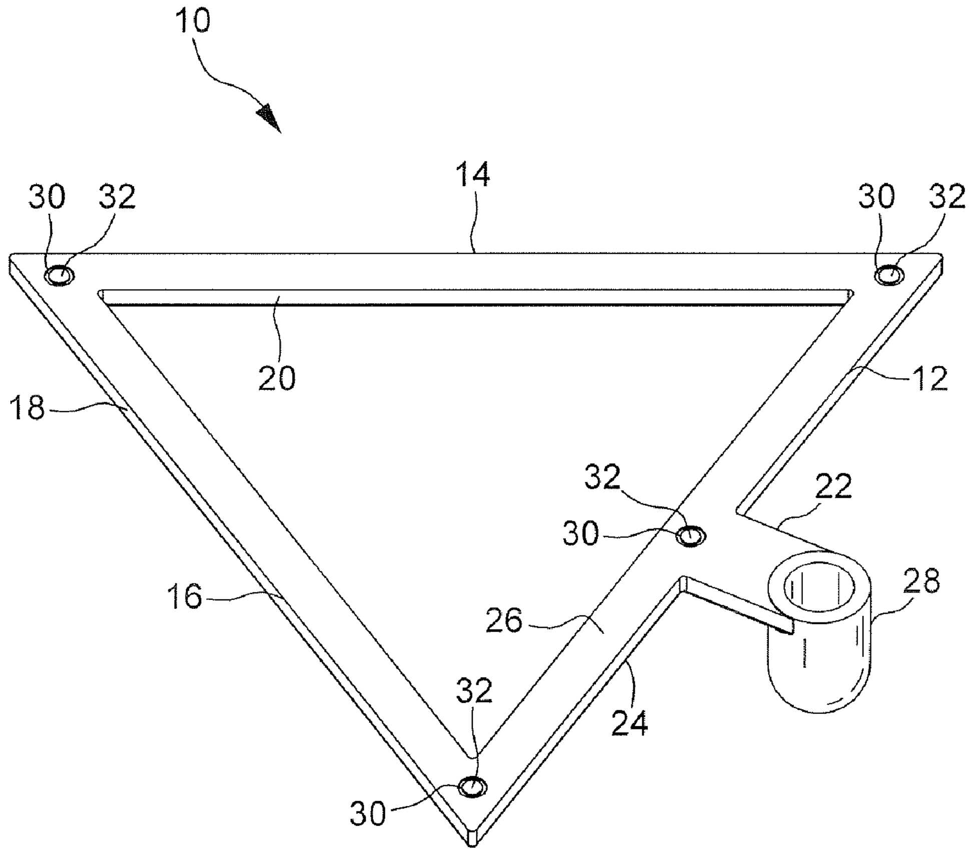
FIG. 2 is a bottom perspective view of the template illustrated in FIG. 1.

Referring to FIGS. 1-2 there is illustrated a template, generally indicated by reference numeral 10. The template 10 is formed in a selected shape and employed to trace the shape of the template on a writing surface such as a piece of paper, for example. The illustrated template 10 is in the shape of a triangle. It should be understood that the template 10 can be formed in any selected geometric shape such as a circle, a square, or a crescent, for example. Additionally, it should be understood that the template 10 can be formed in the shape of a selected item such as a car, flag, or a bell, for example. Templates in the shape of letters or numbers can also be produced.

The template 10 includes sides 12, 14, 16 integrally connected to form a substantially planar main body having having a triangular configuration with an outer edge 18 and a spaced apart inner edge 20. It should be understood that the template 10 can be formed as a solid main body not having an inner edge 20. An arm 22 is integrally connected to side 12 and extends outwardly from the outer edge 18 of the template 10 in substantial planar alignment with the triangular configuration of the sides 12, 14, 16. It should be understood that the arm 22 can be integrally connected with the sides 14, 16, and that the arm 22 can be formed to extend inwardly from the inner edge 20 of the sides 12, 14, 16.

The sides 12, 14, 16 and arm 22 define a first side 24 and a spaced apart second side 26 of the template 10. A handle 28 is formed on the first side 24 of the arm 22 and extends latterly outwardly therefrom. It should be understood that the handle 28 can be integrally formed with the first side 24 or attached thereto with an adhesive or a fastener such as a threaded member or rivet, for example. The handle 28 can include a bulbous end or a disk shaped end, for example, to facilitate a person gripping the handle 28. It should be understood that the handle 28 can be formed on the first side 24 of the sides 12, 14, 16, thus eliminating the necessity for the arm 22. In the event the template 10 is formed as a solid main body, the arm 22 can be eliminated and/or the handle 28 can be formed on or attached to a center portion of the solid main body.

The template 10 is provided with a plurality of counterbores 30 formed in the second side 26 to receive securing members 32 disposed therein. In the illustrated embodiment, the securing members 32 are skid-resistant members having a surface extend outwardly from the second side 26 of the template 10 to contact a material such as a writing surface and militate against the template 10 sliding or moving when the second side 26 of the template 10 is held against the material. It should be understood that the securing members 32 can be formed from an elongate member that circumscribes the entire template 10, or a substantial portion thereof. Favorable results have been obtained employing a silicone material to form the securing members 32. It should be understood that the securing members 32 can be formed from any elastomeric material or other material having a desired coefficient of friction. In the illustrated embodiment, an adhesive is employed to secure the securing members 32 to the template 10. Further, it should be understood that the securing members 32 can be formed integrally with the second surface 24, or secured to the second surface 24 with a fastener or by a mechanical engagement with a feature formed on or attached to the second surface 26, for example.

The template 10 can be formed from a plastic material employing an injection molding process; or by cutting the template 10 from a planar sheet of plastic material and attaching the handle 28 and securing members 32 thereto. It should be understood that other materials and processes may be used to form the template 10.

In use, a user places the template 10 on the material such as the writing surface, for example. The securing members 32 disposed on the second surface 26 face and are in contact with the material. The user grips the handle 28 with a hand and exerts a force thereon while employing a writing instrument in the user's other hand to trace the shape of the template 10 along the inner edge 20 or the outer edge 18 of the template 10 onto the material. In the embodiment shown, favorable results have been obtained by tracing the shape of the template 10 along the inner edge 20 of the template as the handle 28 and arm 22 are spaced from the inner edge 20 and, therefore, do not interrupt the process of tracing the shape of the template 10. The handle 28 and the securing members 32 cooperate to facilitate maintaining the template 10 in a fixed position in respect of the writing surface while the shape of the template 10 is traced. The template 10 is particularly useful in assisting and training young children and individuals with physical or mental disabilities to trace and draw.

Figure 3:
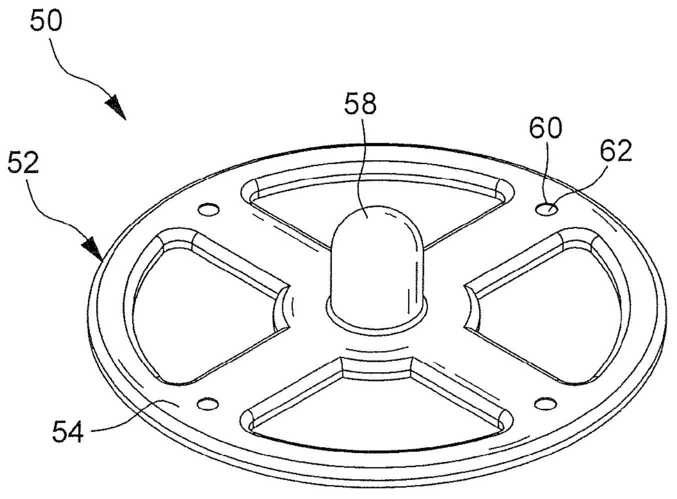
FIG. 3 is a top perspective view of a member of a template according to another embodiment of the invention.
Figure 4:
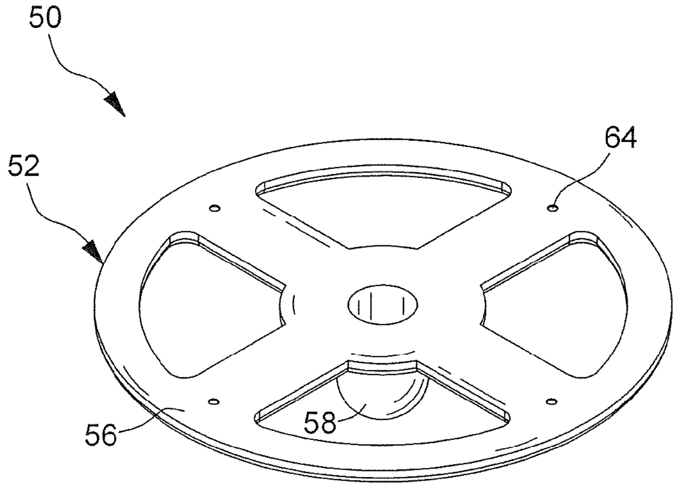
FIG. 4 is a bottom perspective view of the member of the template illustrated in FIG. 3.
Figure 5:
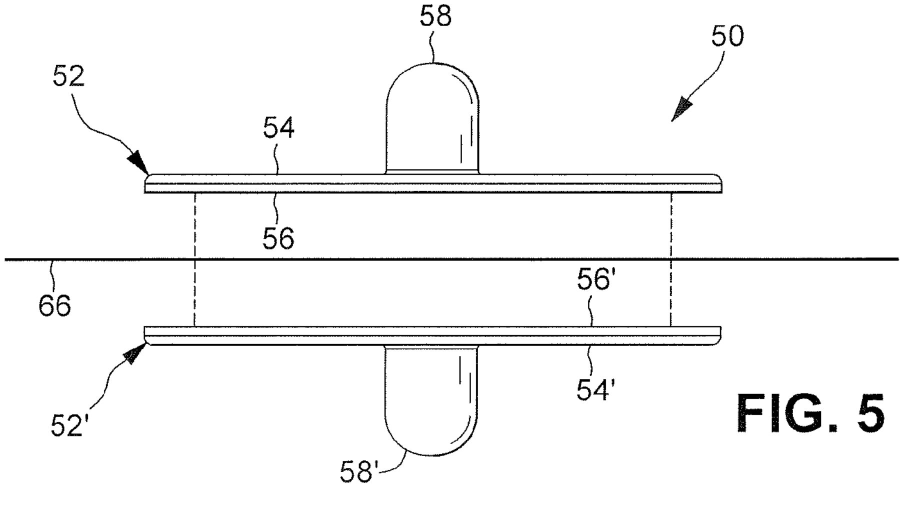
FIG. 5 is a side elevational view of a pair of the members of the template illustrated in FIGS. 3-4 showing a material disposed therebetween.
Figure 6:
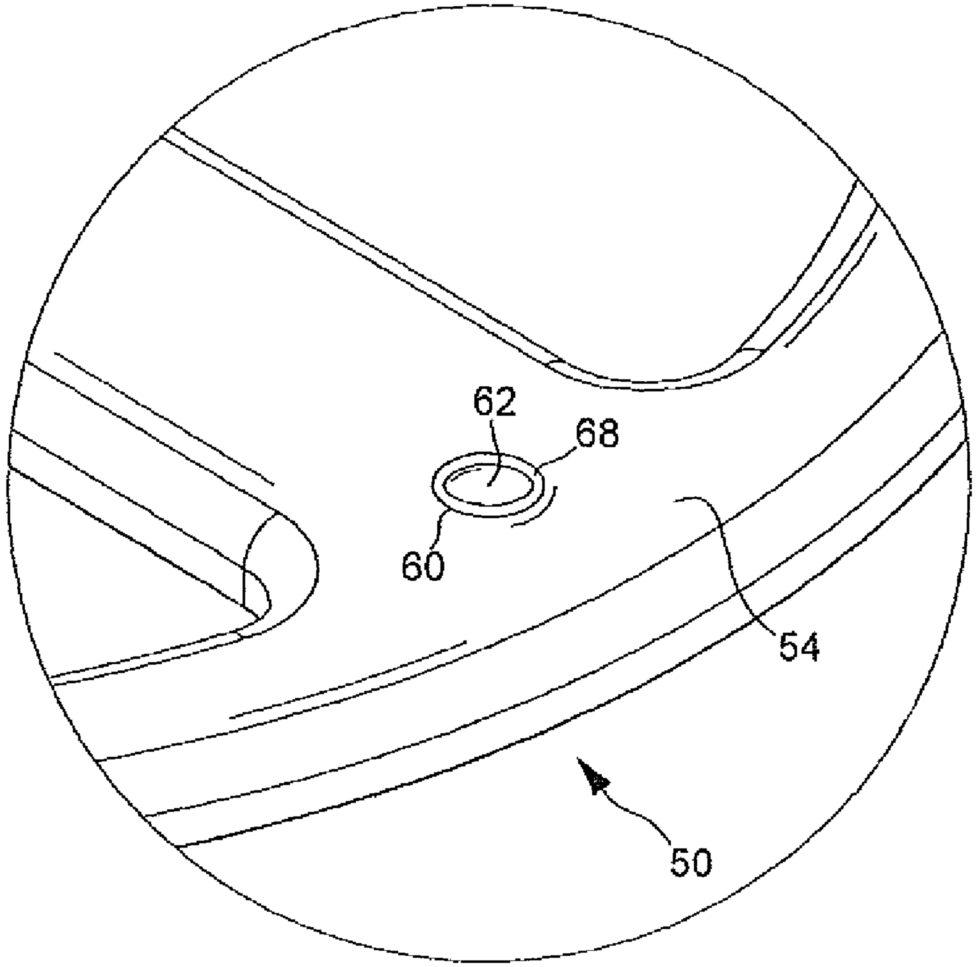
FIG. 6 is an enlarged fragmentary top perspective view of the template shown in FIG. 3, further illustrating a counter bore and the mechanical engagement securing a securing member disposed in the counter bore.

Referring to FIGS. 3-5, there is illustrated a template, generally indicated by reference numeral 50, according to another embodiment of the invention. The template 50 includes a pair of cooperating template members 52, 52' formed in a desired substantially matching geometric shape. It should be understood that the template members 52, 52' are formed to be substantially matching in size and structure. The structure of the template member 52 is described herein. In respect of the template member 52' illustrated in FIG. 5, structure similar to the template member 52 includes the same reference numeral and a prime (') symbol. The illustrated template members 52, 52' of the template 50 are in the shape of a circle or a disk. It should be understood that the template members 52, 52' of the template 50 can be formed in any selected geometric shape such as a square, a triangle, or a crescent, for example. Additionally, it should be understood that the template 50 can be formed in the shape of a selected item such as a car, flag, or a bell, for example. Templates in the shape of letters or numbers can also be produced.

The template member 52 includes a substantially planar main body having a first surface 54 and a spaced apart substantially planar second surface 56. A handle 58 is formed on the first surface 54 and extends outwardly therefrom. It should be understood that the handle 58 can be formed separately and attached to the first surface 54 employing an adhesive or a fastener such as a threaded member or rivet, for example. Further, it should be understood that handle 58 can include a bulbous end, a disk shaped end, or a selected contoured profile, for example, to facilitate a user gripping the handle 58. Alternatively, the first surfaces 54, 54' of one or both of the template members 52, 52' may not include the handles 58, 58', respectively.

A plurality of counter bores 60 is formed in the first surface 54 of the template member 52 to receive securing members 62 therein. In the illustrated embodiment, the securing members 62 are magnets. Apertures 64 are formed through the template member 52 at the bottom of the counter bores 60. It has been found that the apertures 64 maximize a magnetic force at the second surface 56. In the illustrated embodiment, the securing members 62 are coupled to the template member 52 within the counter bores 60 employing an interference fit therebetween. It should be understood that an adhesive can be employed to couple the securing members 62 to the template member 52 within the counter bores 60. It should also be understood that the securing members 62 may be secured by mechanical engagement with a feature 68 formed on or attached to the first surface 54, for example.

In the illustrated embodiment, the magnetic securing members 62, 62' coupled to the template members 52, 52' are adapted to magnetically secure the second surface 56 of the template member 52 to the second surface 56' of the template member 52' with a material 66, such as a piece of paper, disposed therebetween. Accordingly, the securing members 62, 62' are coupled to the template members 52, 52' with opposing securing members 62, 62' having opposite facing magnetic poles to cause the second surfaces 56, 56' to magnetically attract. It should be understood that one of the template members 52, 52' can include ferrous members in place of the magnets. Favorable results have been obtained by coupling the securing members 62, 62' to the template members 52, 52' at selected locations to facilitate joining the template members 52, 52' in substantial alignment. In the illustrated embodiment, the securing members 62, 62' are disposed at about ninety degree intervals around the periphery of the template members 52, 52' providing four magnets for each of the template members 52, 52'. By disposing the securing members 62, 62' at the selected locations, the template members 52, 52' magnetically attach only when substantially aligned. As another example, in a triangular shaped template, the securing members 62, 62' can be disposed at each corner of the respective triangles causing the members to magnetically attach only when the corners thereof are substantially aligned.

The template members 52, 52' of the template 50 can be formed from a plastic material employing an injection molding process; or by cutting the template members 52, 52' from a planar sheet of plastic material and attaching the handles 58, 58' and the securing members 62, 62' thereto. It should be understood that other materials and processes may be used to form the template members 52, 52' of the template 50.

In use, a user places the material 66 between the second surface 56 of template member 52 and the second surface 56' of the template member 52', as illustrated in FIG. 5. The template members 52, 52' are then aligned and magnetically joined together in substantial alignment with the material 66 disposed therebetween. The user grips one of the handles 58, 58' with one hand while employing a cutting instrument such as a pair of scissors, for example, in the user's other hand to cut along the outer edge of the template 50. The outer edge of the template 50 provides a guide for the user to follow with the scissors. The magnetically joined template members 52, 52' hold the material 66 in a fixed position in respect of the template 50 while the shape of the template 50 is cut from the material 66. Upon completion of cutting the shape of the template 50 from the material 66, the user grasps handle 58 with one hand and handle 58' with the other hand and applies a force thereto to overcome the attractive magnetic force between the magnetic securing members 62, 62' and separate the template members 52, 52' which releases the cut material from therebetween. The template 50 is particularly useful in assisting and training young children and individuals with physical or mental disabilities to cut shapes out of a piece of paper.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A template comprising:

a main body formed in a desired shape and having a first side surface and a second side surface, each of the first side surface and the second side surface being substantially planar, the main body including an outer edge surface and a spaced apart inner edge surface, each of the outer edge surface and the inner edge surface disposed between the first side surface and the second side surface, a plurality of counter bores formed in the second side surface of the main body;

a handle coupled to the main body, the handle including a hollow cylinder having an opening at an end proximal the main body and a semi-spherical closure at an end distal the main body, wherein the main body includes an arm extending outwardly from the outer edge surface, the handle coupled to an end of the arm; and a plurality of skid-resistant members coupled to the second side surface of the main body, each of the skid-resistant members disposed in one of the counter bores formed in the second side surface of the main body and secured within the counter bores by an adhesive, wherein the handle and the skid-resistant members facilitate gripping the template and maintaining the template in a fixed position in respect of a writing surface.

2. The template according to claim 1, wherein the skid-resistant members are each formed from a resilient material.

3. A template comprising:

a first template member formed in a desired shape and having a first side surface and a second side surface, each of the first side surface and the second side surface being substantially planar, the first template member including an outer edge surface and a spaced apart inner edge surface, each of the outer edge surface and the inner edge surface disposed between the first side surface and the second side surface, a plurality of counter bores formed in the first side surface of the first template member;

a second template member formed in the desired shape and having a first side surface and a second side surface, each of the first side surface and the second side surface being substantially planar, the second template member including an outer edge surface and a spaced apart inner edge surface, each of the outer edge surface and the inner edge surface disposed between the first side surface and the second side surface, a plurality of counter bores formed in the first side surface of the second template member;

a handle coupled to the first side surface of each of the first template member and the second template member, each of the handles including a hollow cylinder having an opening at an end proximal one of the first template member and the second template member, and a semi-spherical closure at an end distal one of the first template member and the second template member; and a plurality of securing members for securing the first template member to the second template member, each of the securing members disposed in one of the counter bores formed in the first side surfaces of the first template member and the second template member and secured within the counter bores by mechanical engagement with a feature formed on or attached to the first side surface, wherein a material disposed between the first template member and the second template member can be cut by a user.

4. The template according to claim 3, wherein each of the securing members for securing the first template member to the second template member is magnetic.

5. The template according to claim 3, wherein each of the securing members for securing the first template member to the second template member is a magnet coupled to at least one of the first template member and the second template member.

6. The template according to claim 5, wherein each of the counter bores includes an aperture formed at a bottom thereof, the apertures formed in the second side surface, and each of the apertures have a diameter smaller than a diameter of the respective counter bore.

7. The template according to claim 6, wherein the magnets are coupled to the first template member at selected locations and the magnets are coupled to the second template member at selected locations to secure the first template member to the second template member in substantial alignment.

8. The template according claim 7, wherein the magnets are oriented on the first template member and on the second template member to cause the first template member to be attracted to the second template member.

* * * * *